US006633021B2

(12) United States Patent
Matubara (10) Patent No.: US 6,633,021 B2
(45) Date of Patent: Oct. 14, 2003

(54) SOLDERING IRON WITH HEATED GAS FLOW (76) Inventor: Kensei Matubara, 10-29, Shinzaike Nakanomachi, Himeji-shi, Hyogo (JP)

( * ) Notice: Subject to any disclaimer, the term of this patent is extended or adjusted under 35 U.S.C. 154(b) by 24 days.

(21) Appl. No.: 10/000,797

(22) Filed: Dec. 4, 2001

(65) Prior Publication Data

US 2002/0079305 A1 Jun. 27, 2002

(51) Int. Cl.[7] .................................. B23K 3/00
(52) U.S. Cl. ........................... 219/229; 228/51
(58) Field of Search .................. 219/229–234, 219/240–241; 392/379; 228/51, 55

(56) References Cited

U.S. PATENT DOCUMENTS

| 2,477,195 A | * | 7/1949 | Moody | 228/51 |
| 2,515,462 A | * | 7/1950 | McGruer | 228/51 |
| 3,356,830 A | * | 12/1967 | Schleer et al. | 392/476 |
| 3,422,247 A | * | 1/1969 | Royston et al. | 219/230 |
| 4,419,566 A | * | 12/1983 | Fortune | 219/230 |
| 4,926,028 A | * | 5/1990 | Fortune | 219/230 |
| 5,054,106 A | * | 10/1991 | Fortune | 392/476 |
| 5,234,157 A | * | 8/1993 | Fletcher et al. | 228/219 |
| 5,483,040 A | * | 1/1996 | Fortune | 219/230 |
| 5,683,603 A | * | 11/1997 | Fortune | 219/229 |
| 6,247,631 B1 | * | 6/2001 | Kawakatsu et al. | 228/51 |

FOREIGN PATENT DOCUMENTS

| JP | 7-132369 A | | 5/1995 |
| JP | 2000-657 | * | 1/2000 |
| JP | 2000-334563 A | | 12/2000 |
| JP | 2001-205429 | * | 7/2001 |
| WO | WO 98/30352 A | | 7/1998 |

* cited by examiner

Primary Examiner—John A. Jeffery
(74) Attorney, Agent, or Firm—Smith Patent Office

(57) ABSTRACT

It is an object to provide a solder iron such that in the solder iron for blowing out a heating gas flow to a periphery of a forward end tip, the heating gas flow having stable temperature is generated. A nozzle section is provided to a forward end tip heated by heating means of a solder iron main body, an orifice section is formed between a heating gas flow generating chamber and the nozzle section, and a back pressure of thermally expanded heating gas and a pressure of gas successively supplied are balanced in the heating gas flow generating chamber.

23 Claims, 6 Drawing Sheets

SOLDERING IRON WITH HEATED GAS FLOW

BACKGROUND OF THE INVENTION

1. Field of the Invention

The present invention relates to a soldering iron that is capable of soldering electronic parts, for example with high quality.

2. Discussion of the Related Art

For example in the case where an electronic equipment is assembled, various electronic parts and wires are soldered to an electronic substrate mostly by using a soldering iron. In such a soldering iron, a forward end tip is heated by heating means such as a heater, and this is brought into contact with a land or a workpiece of the electronic substrate so that solder is fused, and the forward end tip is separated so that the solder is solidified. This system is widely adopted.

However, due to a relation that the forward end tip is brought into contact with a soldered portion, a temperature of the forward end tip fluctuates, and thus the temperature of the forward end tip is controlled by voltage control and PDI control. However, the fluctuation of the temperature is vigorous depending on a circumstance of the soldered portions such as a radiation plate, a metal case or an earth terminal or a connector pin which requires extremely large heating value, and thus defective soldering easily occurs.

In addition, a thermal stress due to heat cycle works on the forward end tip, and corrosion of the forward end tip occurs due to diffusion of tin and flux so that a life of the forward end tip becomes short. For this reason, it is necessary to replace the soldering iron with new one every 20,000th to 30,000th time in order to secure the accuracy of the soldering.

On the contrary, Japanese Patent Application Laid-Open No. 07-132369 (1995) suggests a soldering iron where a hot air is discharged onto a periphery of the forward end tip, but facility for generating hot air is required.

In addition, the inventors have developed a soldering iron in such a manner that a heating gas flow generating chamber is formed around heating means for heating a forward end tip and a forward end side of the heating gas flow generating chamber is opened around the forward end tip, and a heating gas flow is generated so as to blowout onto the periphery of the forward end tip (see WO 98/30352).

In the above-mentioned system for blowing out the heating gas flow onto the periphery of the forward end tip, since theoretically the forward end tip is in the atmosphere of the heating gas flow, the fluctuation in temperature of the forward end tip is small, and since a soldered portion can be preheated, this system has an advantage that excellent soldering property can be obtained.

However, In the above structure that the heating gas flow generating chamber is formed around the heating means for heating a forward end tip, the temperature of the heating gas flow is not stabilized, and the above-mentioned effect cannot be occasionally obtained.

SUMMARY OF THE INVENTION

In order to solve the above problem, it is an object of the present invention to provide a soldering iron that is capable of generating a heating gas flow with stable temperature.

Therefore, a soldering iron of the present invention where a forward end tip is heated by heating means contained in a soldering iron main body, whereas a heating gas flow is generated in a heating gas flow generating chamber by heating of the heating means so as to blowout to a periphery of the forward end tip, is characterized in that: a nozzle section is provided to the forward end tip so as to surround its periphery and to be opened forward, whereas an orifice section is formed between the heating gas flow generating chamber and the nozzle section; and a diameter of the orifice section is set to a dimension such that a gas supplied into the heating gas flow generating chamber by constant pressure is heated to be thermally expanded in the heating gas flow generating chamber by heating of the heating means, and a back pressure of the thermally expanded heating gas and a pressure of a gas continuously supplied are balanced in the heating gas flow generating chamber so that a part of the heating gas heated to a predetermined temperature blowouts from the orifice section to the nozzle section, whereas the gas supplied continuously is mixed with the thermally expanded heating gas by a convection so as to be preheated.

One of the features of the present invention is that the orifice section is formed between the heating gas flow generating chamber and the nozzle section, the supplied gas is heated and expanded in the heating gas flow generating chamber, the back pressure and the pressure of the supplied gas are balanced, and a part of the heating gas is allowed to blowout from the orifice section to the nozzle section, whereas the gas successively supplied is mixed with the heating gas by convection so as to be preheated.

As a result, the pressure of the heating gas flow blowout from the orifice section, namely, from the nozzle section is substantially constant as long as the pressure balance is not collapsed, and the temperature is substantially constant, and a temperature of the heating gas flow to be blowout to the periphery of the forward end tip can be controlled in a stable manner.

A number of the orifice section may be one or plural. The form and material quality of the heating means are not particularly limited, but because of the system that the back pressure of the heating gas and the pressure of the supplied gas are balanced, the heating means is a cylindrical heater, and the heating gas flow generating chamber may be formed inside or outside the cylindrical heater.

In addition, a part of the forward end of the forward end tip is utilized for fusing solder, and heated other portions are not utilized usefully. Therefore, in the case where the heating gas flow generating chamber is formed inside the cylindrical heater, it is considered preferable that a backward half portion of the forward end tip surrounds a part of or most part of the heating gas flow generating chamber or is inserted into the heating gas flow generating chamber so that a gas in the heating gas glow generating chamber may be further thermally expanded by radiation of heat stored in the forward end tip.

In addition, a backward half portion of the forward end tip surrounds a part or most part of the heating gas flow generating chamber outside the cylindrical heater so that the gas in the heating gas flow generating chamber can be further thermally expanded by radiation of heat stored in the forward end tip. Particularly in this case, when a metal cylindrical body capable of preventing heat diffusion to the outside is externally fitted to the backward half portion of the forward end tip, heat radiated uselessly from the forward end tip can be recovered and utilized by heating gas so that thermal efficiency can be improved greatly. Namely, also while the soldering work is not carried out, it is conventionally necessary to allow an electric current (stand-by current) to flow in order to maintain the heating means at high temperature, the heat is diffused uselessly, and thus the stand-by current is ineffective as energy. However, as mentioned above when the heat stored in the forward end tip is utilized for heating gas, the ineffective energy can be utilized as effective energy for heating gas. Therefore, the soldering iron of the present invention can execute the soldering work by means of the efficiently heated heating gas flow and the heat of the forward end tip with high energy efficiency. The soldering iron of the present invention is a completely new type soldering iron that can be called as an energy saving type soldering iron or hybrid type soldering iron, and it can contribute to needs in the recent market and global reduction of energy.

The backward half portion of the forward end tip does not surround the heating gas flow generating chamber and the cylindrical heater as mentioned above, but may be inserted into them. Namely, the heating means is the cylindrical heater, the heating gas flow generating chamber is formed outside the cylindrical heater, the backward half portion of the forward end tip is inserted into the heating gas flow generating chamber so that the gas in the heating gas flow generating chamber can be further thermally expanded by radiation of the heat stored in the forward end tip.

The nozzle section is fixed to a forward half base portion of the forward end tip, but in order to improve the thermal efficiency, the base portion of the nozzle section covers the forward half base portion of the forward end tip so that the heat diffusion may be prevented. Namely, it is preferable that the base portion of the nozzle section is a cylindrical shape and is made of a material capable of preventing the heat diffusion to the outside, and the cylindrical portion is externally fitted to the forward half base portion of the forward end tip.

Normally, since a copper metal material such as oxygen free high conductivity copper is mostly used for the forward end tip, it is preferable that a stainless, iron or titanium metal material is used for the metal cylindrical body and the cylindrical portion.

In addition, because of the structure that the heating gas is allowed to blowout from the heating gas flow generating chamber to the nozzle section, when the heating gas flow is allowed to blowout from the forward end tip, this forward end tip can be used for the non-contact type soldering iron. Namely, the blowout passage of the heating gas flow is formed on the forward end tip so as to be connected with the heating gas flow generating chamber and be opened at the forward end, and the heating gas flow is allowed to blowout to the forward side of the forward end tip so that the non-contact soldering is possible. Moreover, the structure of the above-mentioned tip is novel.

The invention can provide a forward end tip of a soldering iron, the soldering iron being constituted so that a forward end tip is heated by cylindrical heating means contained in a soldering iron main body, whereas a heating gas flow generating chamber is formed inside or outside the heating means, and a heating gas flow is generated in the heating gas flow generating chamber by heating of the heating means so as to blowout to a periphery of the forward end tip, the forward end tip being attached to a forward end of the soldering iron main body detachably, characterized in that: a backward half portion of the forward end tip surrounds a part or most part of the heating gas flow generating chamber so as to be capable of attaching to a forward end of the soldering iron main body; and a forward half portion of the forward end tip is formed with a concave section forming a part of the heating gas flow generating chamber, and an orifice section is formed at a forward end of the concave section, and a nozzle section is attached to a forward half base portion of the forward end tip so as to surround the forward half portion and be opened forwardly and to be connected with the orifice section.

In addition, the invention can provide a forward end tip of a soldering iron, the soldering iron being constituted so that a forward end tip is heated by cylindrical heating means contained in a soldering iron main body, whereas a heating gas flow generating chamber is formed inside or outside the heating means, and a heating gas flow is generated in the heating gas flow generating chamber by heating of the heating means so as to blowout to a periphery of the forward end tip, the forward end tip being attached to a forward end of the soldering iron main body detachably, characterized in that: a backward half portion of the forward end tip is inserted into the heating gas flow generating chamber or the heating means so as to be capable of attaching to a forward end of the soldering iron main body; and a forward half portion of the forward end tip is formed with a concave section forming a part of the heating gas flow generating chamber, and an orifice section is formed at a forward end of the concave section, and a nozzle section is attached to a forward half base portion of the forward end tip so as to surround the forward half portion and be opened forwardly and to be connected with the orifice section.

Further, the present invention can provide a forward end tip of a soldering iron, the soldering iron being constituted so that a forward end tip is heated by cylindrical heating means contained in a soldering iron main body, whereas a heating gas flow generating chamber is formed inside or outside the heating means, and a heating gas flow is generated in the heating gas flow generating chamber by heating of the heating means so as to blowout to a periphery of the forward end tip, the forward end tip being attached to a forward end of the soldering iron main body detachably, characterized in that: a backward half portion of the forward end tip is inserted into the heating means so as to be capable of attaching to a forward end of the soldering iron main body; and a forward half outer periphery of the forward end tip is formed with orifice section having a concave groove shape connected with the heating gas flow generating chamber, and a nozzle section is attached to a forward half base portion of the forward end tip so as to surround the forward half portion and be opened forwardly and to be connected with the orifice section.

The above-mentioned forward end tip to be used in the soldering iron can have the non-contact structure.

Solder is again fused and sucked at the time of repairing a soldered portion. On the other hand, one of the features of the present invention is, as mentioned above, that the temperature of the heating gas that is subject to blowout to the periphery of the forward end tip can be controlled in a stable manner. Therefore, when the system of the present invention is applied to the suction instrument for soldering, it is expected that the repairing work can be carried out in a stable manner.

Namely, the present invention can provide a solder suction instrument for heating a forward end tip by means of heating means contained in a instrument main body and fusing solder by means of heat of the forward end tip and sucking the fused solder, characterized in that: a heating gas flow generating chamber for generating a heating gas flow by means of heating of the heating means is provided into the instrument main body, a nozzle section is provided to the forward end tip so as to surround a periphery of the forward end tip and to be opened forwardly, and an orifice section is formed between said nozzle section and the heating gas flow generating chamber; and a diameter of the orifice section is set to a dimension such that gas supplied into the heating gas flow generating chamber by a constant pressure is heated to be thermally expanded in the heating gas flow generating chamber by heating of the heating means, and a back pressure of the thermally expanded heating gas and a pressure of gas successively supplied are balanced in the heating gas flow generating chamber so that a part of the heating gas heated to a predetermined temperature is allowed to blowout from the orifice section to the nozzle section, whereas the gas successively supplied is mixed with the thermally expanded heating gas by convection so as to be preheated; and a suction passage for the fused solder is provided to the forward end tip so as to be opened to its forward end.

In addition, the forward end tip to be used for a solder suction instrument is novel, as well.

Namely, the present invention can provide a forward end tip of a solder suction instrument, the solder suction instrument for heating a forward end tip by means of heating means contained in a instrument main body and fusing solder by means of heat of the forward end tip so as to suck the fused solder, the forward end tip being attached detachably to a forward end of the instrument main body, characterized in that: a backward half portion of the forward end tip surrounds a part of or most part of a heating gas flow generating chamber so as to be capable of being attached to a forward end of a solder iron main body; a concave section forming a portion of the heating gas flow generating chamber is formed on a forward half portion of the forward end tip, an orifice section is formed on a forward end of the concave section, and a nozzle section is attached to a forward half base portion of the forward end tip so as to surround the forward half portion and be opened forwardly and to be connected with the orifice section; and a suction passage for the fused solder is formed to be opened at the forward end portion, and a backward end side of the suction passage is provided so as to be capable of being connected with a suction mechanism.

In addition, the present invention can provide a forward end tip of a solder suction instrument, the solder suction instrument for heating a forward end tip by means of heating means contained in a instrument main body and fusing solder by means of heat of the forward end tip so as to suck the fused solder, the forward end tip being attached detachably to a forward end of the instrument main body, characterized in that: a backward half portion of the forward end tip is inserted into a heating gas flow generating chamber or the heating means so as to be capable of being attached to a forward end of a solder iron main body; a concave section forming a portion of the heating gas flow generating chamber is formed on a forward half portion of the forward end tip, an orifice section is formed on a forward end of the concave section, and a nozzle section is attached to a forward half base portion of the forward end tip so as to surround the forward half portion and be opened forwardly and to be connected with the orifice section; and a suction passage for the fused solder is formed to be opened at the forward end portion, and a backward end side of the suction passage is provided so as to be capable of being connected with a suction mechanism.

Further, the present invention can provide a forward end tip of a solder suction instrument, the solder suction instrument for heating a forward end tip by means of heating means contained in a instrument main body and fusing solder by means of heat of the forward end tip so as to suck the fused solder, the forward end tip being attached detachably to a forward end of the instrument main body, characterized in that: a backward half portion of the forward end tip is inserted into the heating means so as to be capable of being attached to a forward end of a solder iron main body; an orifice section having a concave groove shape which is connected with a heating gas flow generating chamber is formed on a forward half outer periphery of the forward end tip, and a nozzle section is attached to a forward half base portion of the forward end tip so as to surround the forward half portion and be opened forwardly and to be connected with the orifice section; and a suction passage for the fused solder is formed to be opened at the forward end portion, and a backward end side of the suction passage is provided so as to be capable of being connected with a suction mechanism.

Here, technical terms of the forward end tip and the solder suction instrument are the same as those of the soldering iron.

Inert gas with high density is preferable as the heating gas flow. When an influence of O2 in the air is taken into consideration for the soldering quality, inert gas such as nitrogen gas is preferable. The heating means may be any type means as long as it generates a heat, and a nichrome wire heater, a ceramic heater, a high frequency heater, a middle frequency heater, a low frequency heater, an infrared heater, a plasma heating element, a ultrasonic heating element, a SiC heating element or the like can be used.

DETAILED DESCRIPTION OF PREFERRED EMBODIMENTS

There will be detailed below the present invention based on concrete examples showing in the diagrams. FIGS. 1 through 4 show preferred embodiments of a soldering iron of the present invention. A backward end base portion of a soldering iron main body 11 is fixed to a forward end of a soldering iron base portion 10, and the soldering iron main body 11 has a cylindrical shape and a cylindrical ceramic heater (heating means) 12 is inserted into the main body 11, and a backward end base portion of the ceramic heater 12 is supported to the soldering iron base portion 10.

Figure 1A:
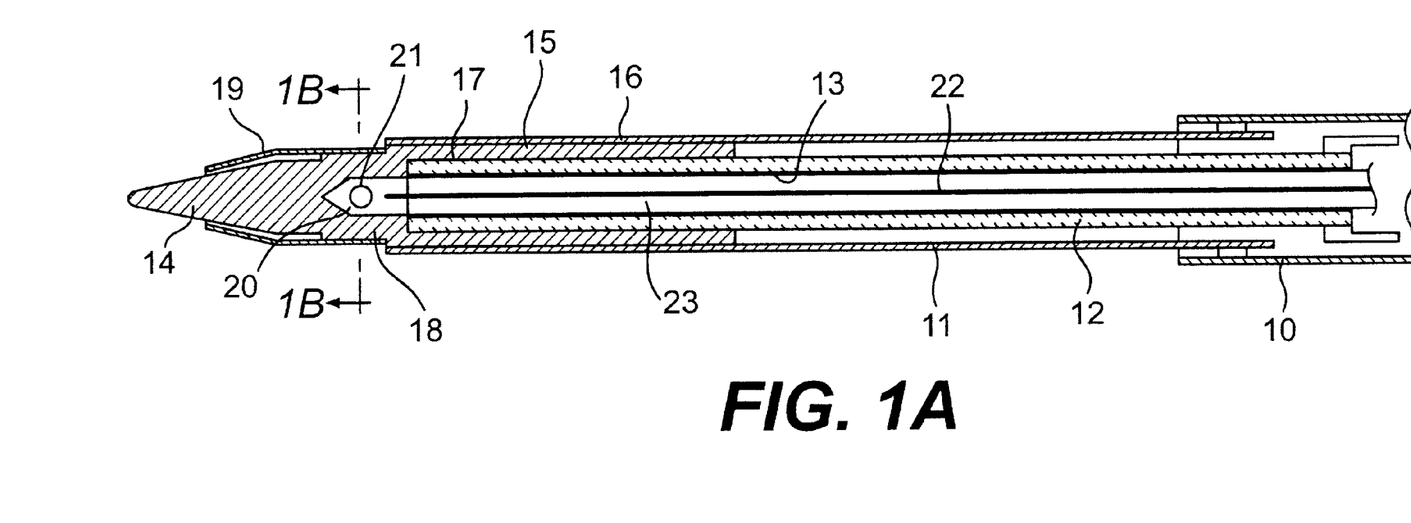
FIG. 1A is a cross sectional view of a main part of a soldering iron according to a preferred embodiment of the present invention.

A nitrogen gas supply pipe 13 is inserted into the ceramic heater 12, and the nitrogen gas supply pipe 13 is supported to the forward end portion of the soldering iron base portion 10, and a soldering iron is inserted into its backward end so as to be connected with a nitrogen gas supply device (not shown) with a supply amount adjusting function.

Figure 2:
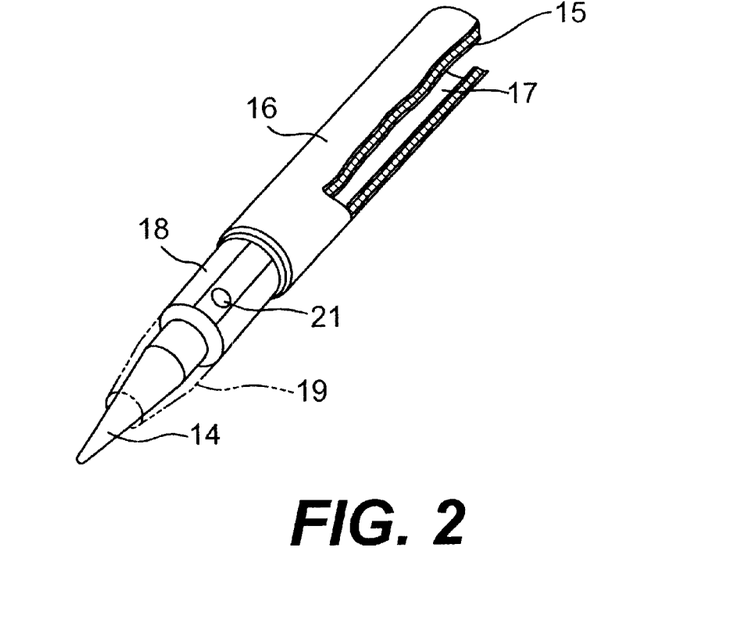
FIG. 2 is a perspective view showing a structure of a forward end tip according to the above embodiment.

On the other hand, a forward end tip 14 is inserted into the forward end of the soldering iron main body 11 from the forward direction so as to be held. The forward end tip 14 is manufactured by oxygen free high conductivity copper, and a cylindrical portion 15 is formed on its backward half portion, and pipes 16 and 17 made of stainless steel are fitted into and are thermocompression-bonded to an outer periphery and an inner periphery of the cylindrical portion 15, and the outer peripheral pipe 17 serves as a heat diffusion preventing pipe. Here, in the case where the pipe 16 is not provided, the cylindrical portion 15 made of oxygen free high conductivity copper is subject to the iron plating treatment so that the similar heat diffusion preventing function can be provided.

The cylindrical portion covers an outside of a heating portion of the ceramic heater 12, and the inner peripheral pipe 17 serves as a seizure preventing pipe for the ceramic heater 12.

In addition, a base portion of a nozzle section 19 is externally fitted to a forward half base portion 18 of the forward end tip 14 so as to be thermocompression-bonded, and the nozzle section 19 covers the forward end tip 14 and its forward end is opened.

Figure 1B:
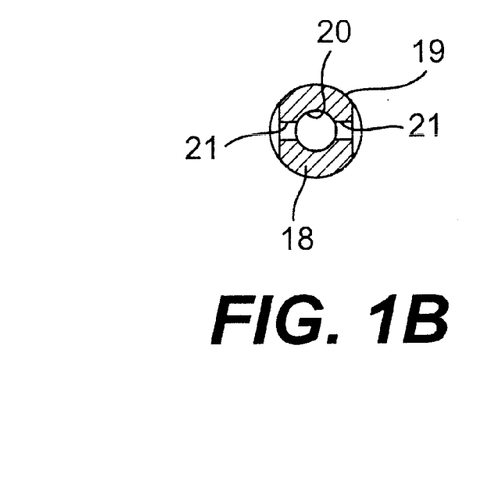
FIG. 1B is a cross sectional view of the main part of the soldering iron taken along line I—I of FIG. 1A.

Further, a concave section 20 which is connected with the nitrogen gas supply pipe 13 is formed in the forward half base portion 18 of the forward end tip 14, and two orifice sections 21, 21 are formed on the forward end of the concave section 20, and the nitrogen gas supply pipe 13 and the concave section 20 compose the heating gas flow generating chamber 23. Moreover, a thermocouple 22 is inserted into the nitrogen gas supply pipe 13 and is extended to the vicinity of the orifice sections 21 so as to detect temperature of a nitrogen gas.

Next, there will be explained below the operation. While the ceramic heater 12 is made to be conductive so as to generate a heat, a nitrogen gas is supplied from the nitrogen gas supply pipe 13. As a result, the heat of the ceramic heater 12 is transmitted to the forward end tip 14, and the temperature of the forward end tip 14 is raised to a predetermined temperature required for soldering.

Figure 3:
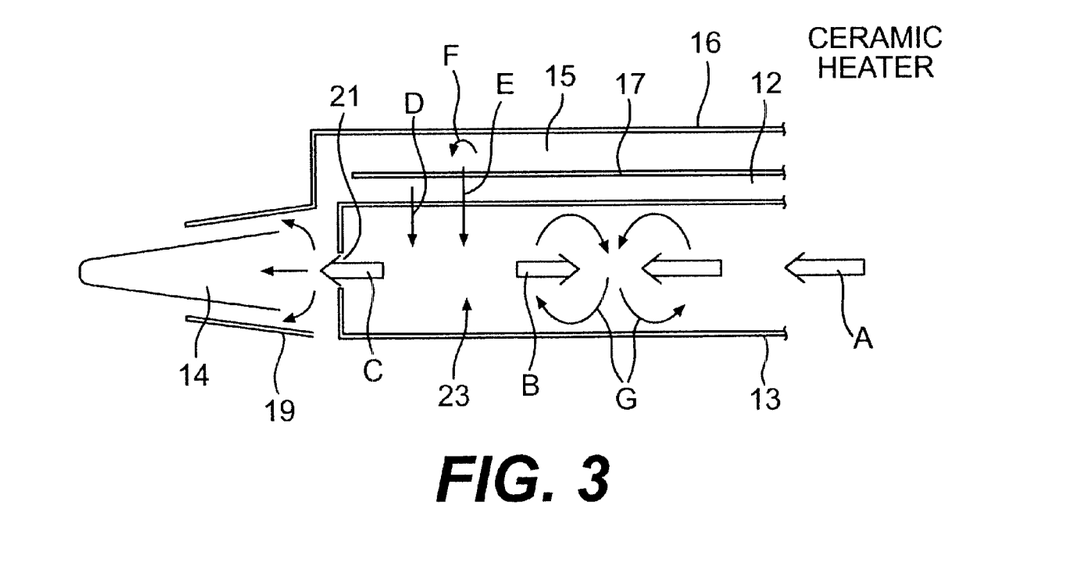
FIG. 3 is a schematic diagram for explaining a function in the above embodiment.

In addition, as shown in FIG. 3, a heat F of the cylindrical portion 15 is prevented from diffusion by the stainless pipe 16, and the supplied nitrogen gas is quickly heated and expanded in the heating gas flow generating chamber 23 by a heat D of the ceramic heater 12 and a radiation heat E of the cylindrical portion 15 of the forward end tip 14, but the nitrogen gas is prevented from directly blowing out by the orifice sections 21, 21 so that a back pressure B is generated. The back pressure B is balanced against a pressure A of the nitrogen gas successively supplied via the nitrogen gas supply pipe 13, and a part C of the heated nitrogen gas passes through the orifice sections 21 so as to blowout from the nozzle section 19 to the periphery of the forward end tip 14.

In addition, when the pressures are balanced as mentioned above, a convection flow is generated between the supplied nitrogen gas and the heated nitrogen gas so that the supplied nitrogen gas is preheated. As a result, the nitrogen gas in the heating gas flow generating chamber 23 is heated in an efficient and stable manner.

Figure 4A:
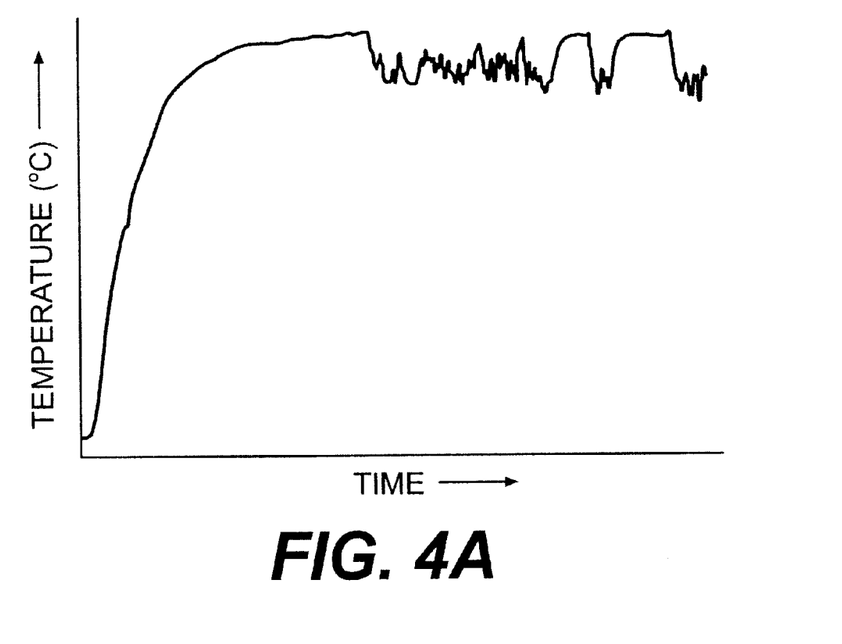
FIGS. 4A and 4B are graphs showing time versus temperature for explaining the functions in the above embodiment.
Figure 4B:
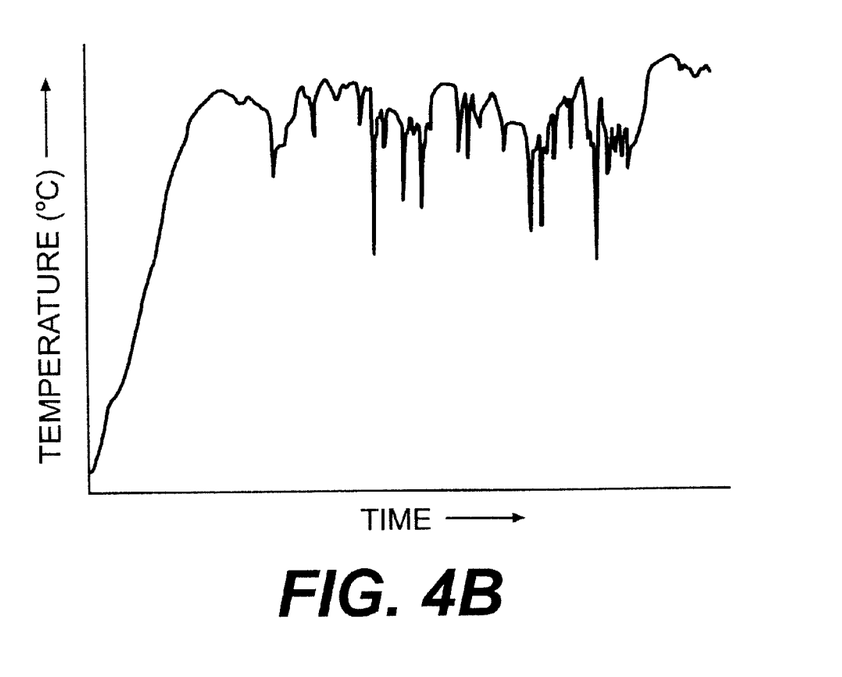

The inventors of this invention repeated soldering using the soldering iron of this example and the soldering iron having the conventional system for not blowing out a nitrogen gas with high temperature. In the soldering iron of this example, when a temperature of the nitrogen gas is set to a temperature slightly higher than the temperature of the forward end tip, as shown in FIG. 4A although the forward end tip lost its heat due to the soldering, the temperature made a transition approximately constantly. However, as shown in FIG. 4B, in the conventional soldering iron, as a number of soldering times increased, the temperature of the forward end tip fluctuated more intensely.

Therefore, the soldering iron of this invention produces the following effects.

(1) Since the nitrogen gas is heated by a thermal energy radiated uselessly, thermal efficiency can be improved.

(2) Since the forward end tip is covered by the heated nitrogen gas, the temperature of the soldered surface of the forward end tip hardly changes, and stable soldering can be carried out.

(3) Since the forward end tip is brought into a non-oxidizing state by the nitrogen gas and the soldered surface of the forward end tip is wet by fused solder, continuous soldering work can be executed.

(4) Since the soldered portion and the solder to be supplied are preheated by the heated nitrogen gas, thermal saturation at the time of the soldering becomes quick, and a temperature difference among workpiece, solder, substrate land and soldering iron becomes less, and solder ball or flux flying can be reduced, and burning of flux and peeling of a substrate pattern can be reduced.

(5) Tn the case where the soldering iron is used as a soldering iron for automatic soldering robot or the like, a number of cleaning times can be reduced, and the productivity can be improved. Moreover, since excessive solder which is removed by cleaning can be reduced, the consumption of solder can be greatly reduced, and thus this soldering iron has the advantage of the cost.

(6) Since the forward end tip can be put in the non-oxidizing atmosphere, the life of the tip can be lengthened to 5 to 10-fold.

Figure 5:
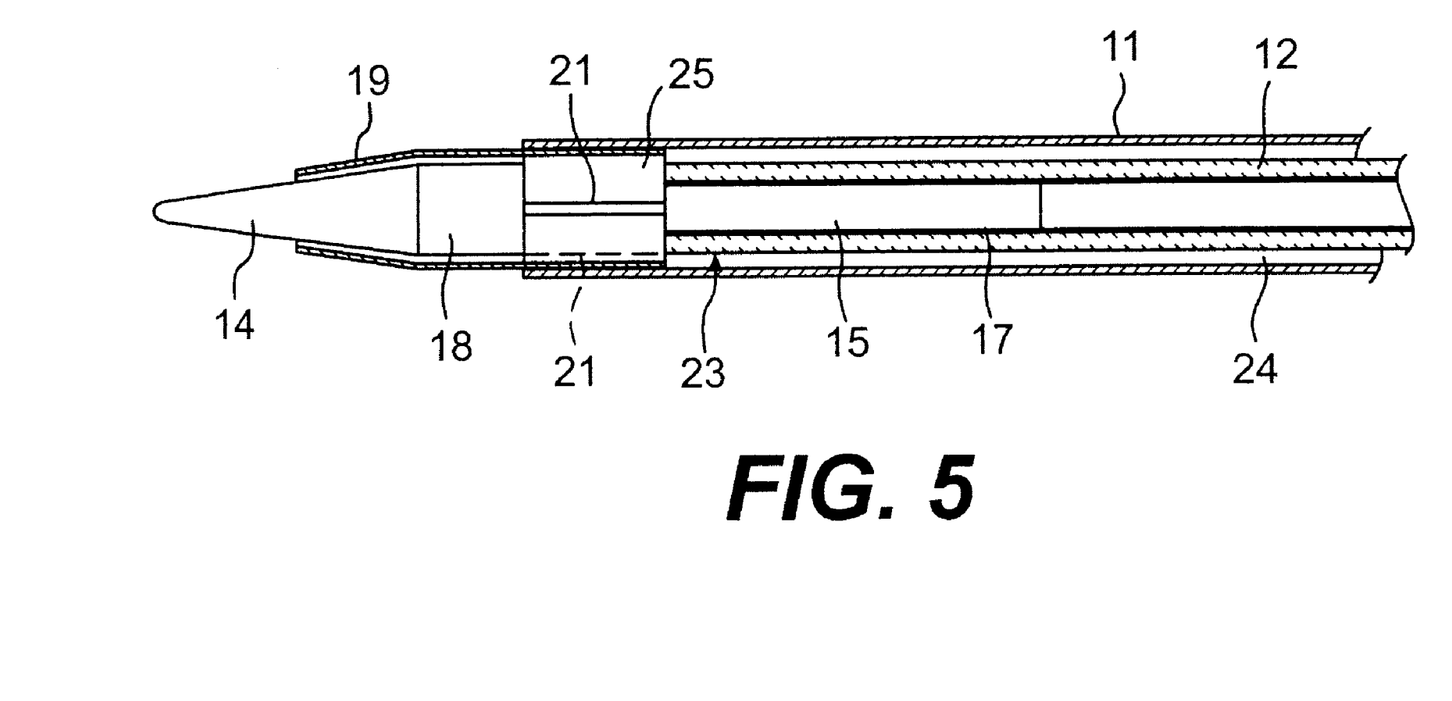
FIG. 5 is a vertical sectional view of a main section according to a second embodiment of this present invention.

FIG. 5 shows a second embodiment. In the diagram, the same reference numerals show portions that are identical to or correspond to the portions in FIGS. 1A and 1B. A nitrogen gas supply passage 24 is formed between the ceramic heater 12 and the soldering iron main body 11 in this example, whereas the backward half portion of the forward end tip 14 is formed into the cylindrical portion 15 with small diameter, and the stainless pipe 17 for preventing seizure is externally fitted to and thermocompression-bonded to the periphery of the cylindrical portion 15, and the cylindrical portion 15 is inserted into the ceramic heater 12. Moreover, a plurality of small-diameter concave grooves (orifice sections) 21 are formed on an outer peripheral surface of a backward half large diameter portion 25 of the forward end tip 14 so as to be extended to an axial direction and be connected with the heating gas flow generating chamber 23.

Figure 6A:
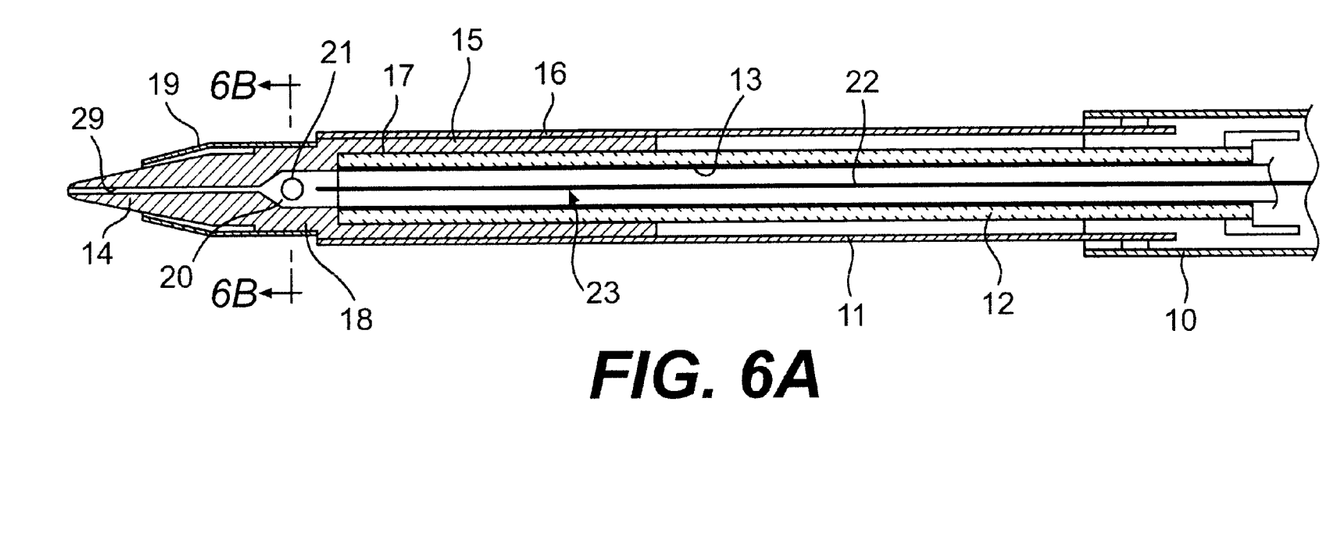
FIG. 6A is a diagram showing a cross sectional view of a modification the first embodiment.
Figure 6B:
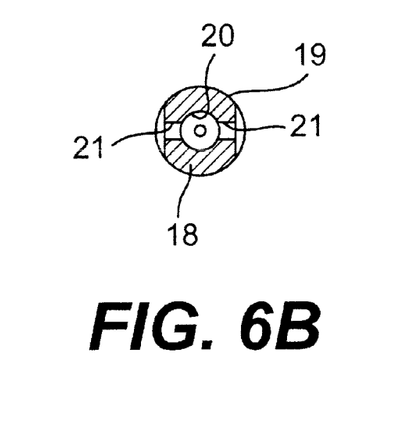
FIG. 6B is a cross sectional view of a modification of the first embodiment taken along line II—II of FIG. 6A.

FIGS. 6A and 6B show a modified example of the first embodiment. In this example a nitrogen gas blowout passage 29 is formed on the forward end tip 14 so as to be connected with the heating gas flow generating chamber 23 and be opened at the forward end of the forward end tip 14. Therefore, the soldering iron of this example allows the nitrogen gas with high temperature to blowout to the forward side of the forward end tip 14 so that non-contact type soldering can be carried out.

Figure 7:
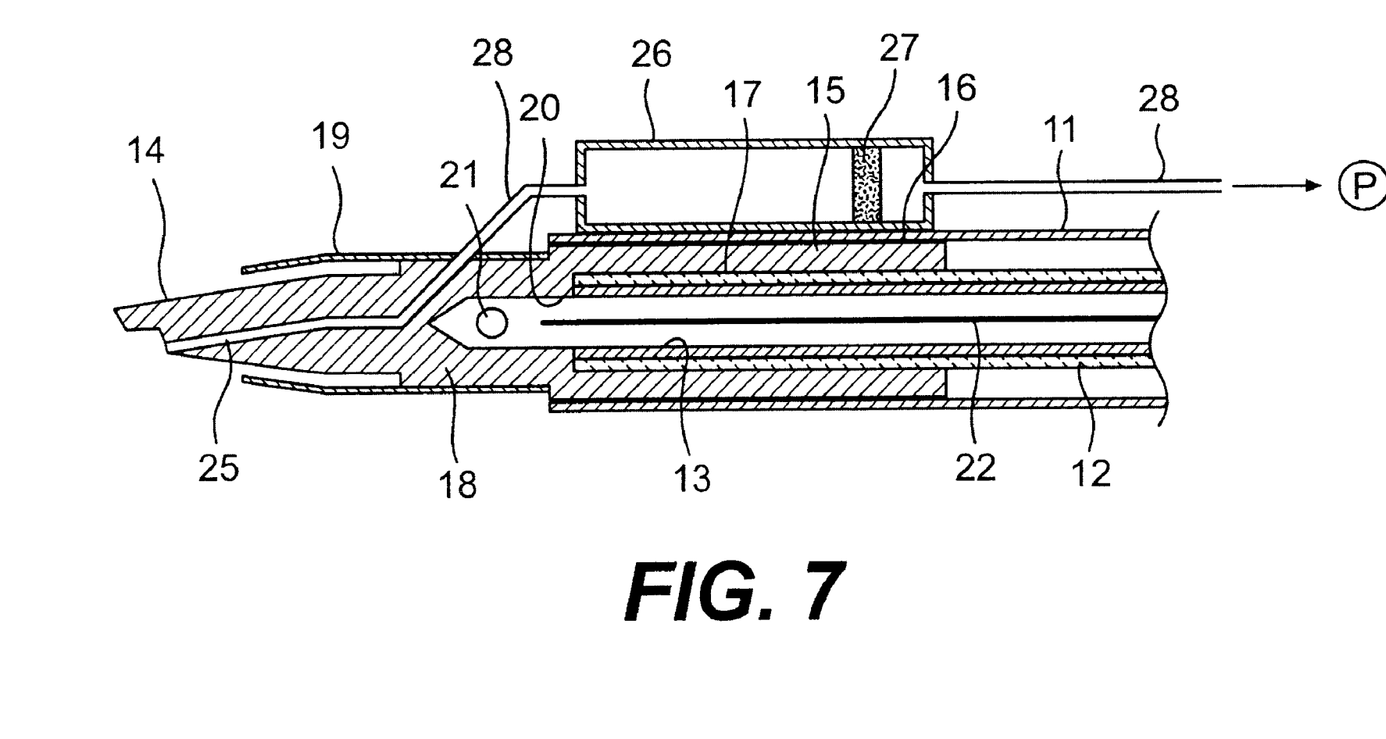
FIG. 7 is a sectional structure diagram showing a solder suction instrument according to a preferred embodiment of the present invention.

FIG. 7 shows preferable embodiment of a solder suction instrument of the present invention. In the diagram, the same reference numerals show the parts that are identical to or correspond to the parts in FIGS. 1A and 1B. In this example, stainless pipes 25 and 28 with small diameter are provided to be inserted through the forward end tip 14, and the backward end of the stainless pipe 28 is connected with a pump P, and a fused solder suction chamber 26 is connected to the middle portion of the stainless pipe 28. A filter 27 is provided in the suction chamber 26 so as to be capable of sucking fused solder in the atmosphere of the nitrogen gas from the forward end of the forward end tip 14.

Here, the shape of the forward end tip 14 is not limited to the above embodiments, and various shapes can be adopted thereto. The diameter of the orifices according to the shapes, and the shape of the nozzle according to the shapes of the forward end tip are adopted so that the atmosphere of the nitrogen gas with high temperature can be efficiently created around the forward end tip by a small amount of nitrogen gas with normal temperature.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A soldering iron where a forward end tip is heated by heating means built in a soldering iron main body, whereas a heating gas flow is generated in a heating gas flow generating chamber by heating of said heating means so as to blowout to a periphery of said forward end tip, wherein:
    a nozzle section is provided to said forward end tip so as to surround its periphery as well as to be opened forward, whereas an orifice section is formed between said heating gas flow generating chamber and the nozzle section; and
    a diameter of said orifice section is set to a dimension such that a gas supplied into said heating gas flow generating chamber by constant pressure is heated to be thermally expanded in said heating gas flow generating chamber by heating of said heating means, and a back pressure of said thermally expanded heating gas and a pressure of a gas continuously supplied are balanced in said heating gas flow generating chamber so that a part of the heating gas heated to a predetermined temperature is subject to blowout from said orifice section to said nozzle section, whereas said gas supplied continuously is mixed with the thermally expanded heating gas by a convection so as to be preheated.

2. The soldering iron according to claim 1, wherein said heating means is a cylindrical heater, and said heating gas flow generating chamber is formed inside of said cylindrical heater.

3. The soldering iron according to claim 2, wherein a backward half portion of said forward end tip surrounds a part or most part of said heating gas flow generating chamber or is inserted into said heating gas flow generating chamber, and the gas in said heating gas flow generating chamber is further thermally expanded by radiation of heat stored in said forward end tip.

4. The soldering iron according to claim 3, wherein a metal cylindrical body capable of preventing heat diffusion to the outside is externally fitted to the backward half portion of said forward end tip.

5. The soldering iron according to claim 4, wherein said forward end tip is made of a copper type metal material, and said metal cylindrical body and/or the cylindrical portion is made of a stainless, iron or titanium type metal material.

6. The soldering iron according to claim 2, wherein said heating means is the cylindrical heater, and said heating gas flow generating chamber is formed inside of said cylindrical heater, whereas a backward half portion of said forward end tip surrounds a part or most part of said heating gas flow generating chamber outside said cylindrical heater, and the gas in said heating gas flow generating chamber is further thermally expanded by radiation of heat stored in said forward end tip.

7. The soldering iron according to claim 1, wherein:
    said heating means is a cylindrical heater, and said heating gas flow generating chamber is formed outside said cylindrical heater; whereas
    a backward half portion of said forward end tip is inserted into said heating gas flow generating chamber, the gas in said heating gas flow generating chamber is further thermally expanded by radiation of heat stored in said forward end tip.

8. The soldering iron according to claim 1, wherein a base portion of said nozzle section has a cylindrical shape made of a material capable of preventing heat diffusion to the outside, and said cylindrical portion is externally fitted to a forward half base portion of said forward end tip.

9. The soldering iron according to one of claim 1, wherein a blowout passage for heated gas flow is formed to said forward end tip so as to be connected with said heating gas flow generating chamber as well as to be opened at the forward end of said forward end tip, and the heating gas flow is allowed to blowout onto the forward side of said forward end tip so that non contact type soldering is possible.

10. A forward end tip of a soldering iron, said soldering iron being constituted so that a forward end tip is heated by cylindrical heating means built in a soldering iron main body, whereas a heating gas flow generating chamber is formed inside or outside said heating means, and a heating gas flow is generated in said heating gas flow generating chamber by heating of said heating means so as to blowout to a periphery of said forward end tip, said forward end tip being attached to a forward end of said soldering iron main body detachably, wherein:
    a backward half portion of said forward end tip surrounds a part or most part of said heating gas flow generating chamber so as to be capable of attaching to a forward end of said soldering iron main body; and
    a forward half portion of said forward end tip is formed with a concave section forming a part of said heating gas flow generating chamber, and an orifice section is formed at a forward end of said concave section, and a nozzle section is attached to a forward half base portion of said forward end tip so as to surround the forward half portion and be opened forwardly and to be connected with said orifice section.

11. The forward end tip of the soldering iron according to claim 10, wherein a blowout passage for the heating gas flow is formed so as to be opened at the forward end and to be connected with said heating gas flow generating chamber, and the heating gas flow is allowed to blowout to the forward portion of said forward end tip so that non-contact type soldering is possible.

12. A forward end tip of a soldering iron, said soldering iron being constituted so that a forward end tip is heated by cylindrical heating means contained in a soldering iron main body, whereas a heating gas flow generating chamber is formed inside or outside said heating means, and a heating gas flow is generated in said heating gas flow generating chamber by heating of said heating means so as to blowout to a periphery of said forward end tip, said forward end tip being attached to a forward end of said soldering iron main body detachably, wherein:

a backward half portion of said forward end tip is inserted into said heating gas flow generating chamber or said heating means so as to be capable of attaching to a forward end of said soldering iron main body; and a forward half portion of said forward end tip is formed with a concave section forming a part of said heating gas flow generating chamber, and an orifice section is formed at a forward end of said concave section, and a nozzle section is attached to a forward half base portion of said forward end tip so as to surround the forward half portion and be opened forwardly and to be connected with said orifice section.

13. A forward end tip of a soldering iron, said soldering iron being constituted so that a forward end tip is heated by cylindrical heating means contained in a soldering iron main body, whereas a heating gas flow generating chamber is formed inside or outside said heating means, and a heating gas flow is generated in said heating gas flow generating chamber by heating of said heating means so as to blowout to a periphery of said forward end tip, said forward end tip being attached to a forward end of said soldering iron main body detachably, wherein:

a backward half portion of said forward end tip is inserted into said heating means so as to be capable of attaching to a forward end of said soldering iron main body; and a forward half outer periphery of said forward end tip is formed with orifice section having a concave groove shape connected with said heating gas flow generating chamber, and a nozzle section is attached to a forward half base portion of said forward end tip so as to surround the forward half portion and be opened forwardly and to be connected with said orifice section.

14. A solder suction instrument for heating a forward end tip by means of heating means contained in a instrument main body and fusing solder by means of heat of said forward end tip and sucking the fused solder, wherein:

a heating gas flow generating chamber for generating a heating gas flow by means of heating of said heating means is provided into said instrument main body, a nozzle section is provided to said forward end tip so as to surround a periphery of said forward end tip and to be opened forwardly, and an orifice section is formed between said nozzle section and said heating gas flow generating chamber; and a diameter of said orifice section is set to a dimension such that gas supplied into said heating gas flow generating chamber by a constant pressure is heated to be thermally expanded in said heating gas flow generating chamber by heating of said heating means, and a back pressure of the thermally expanded heating gas and a pressure of gas successively supplied are balanced in said heating gas flow generating chamber so that a part of the heating gas heated to a predetermined temperature is allowed to blowout from said orifice section to said nozzle section, whereas the gas successively supplied is mixed with the thermally expanded heating gas by convection so as to be preheated; and a suction passage for the fused solder is provided to said forward end tip so as to be opened to its forward end.

15. The solder suction instrument according to claim 14, wherein the backward half portion of said forward end tip surrounds a part or most part of said heating gas flow generating chamber or is inserted into said heating gas flow generating chamber, and the gas in said heating gas flow generating chamber is further thermally expanded by radiation of the heat stored in said forward end tip.

16. The solder suction instrument according to claim 15, wherein a metal cylindrical body capable of preventing heat diffusion to the outside is externally fitted to the backward half portion of said forward end tip.

17. The solder suction instrument according to claim 16, wherein said forward end tip is made of a copper metal material and the metal cylindrical body and/or the cylindrical portion is made of a stainless, iron or titanium metal material.

18. The solder suction instrument according to claim 14, wherein said heating means is a cylindrical heater, and said heating gas flow generating chamber is formed in said cylindrical heater, whereas the backward half portion of said forward end tip surrounds a part or most part of said heating gas flow generating chamber on the outside of said cylindrical heater, and the gas in said heating gas flow generating chamber is further thermally expanded by radiation of heat stored in said forward end tip.

19. The solder suction instrument according to claim 14, wherein said heating means is a cylindrical heater and said heating gas flow generating chamber is formed outside said cylindrical heater, whereas the backward half portion of said forward end tip is inserted into said heating gas flow generating chamber, and the gas in said heating gas flow generating chamber is further thermally expanded by radiation of heat stored in said forward end tip.

20. The solder suction instrument according to claim 14, wherein the base portion of said nozzle section has a cylindrical shape and is made of a material capable of preventing heat diffusion to the outside, and the cylindrical portion is externally fitted to the forward half base portion of said forward end tip.

21. A forward end tip of a solder suction instrument, said solder suction instrument for heating a forward end tip by means of heating means contained in a instrument main body and fusing solder by means of heat of said forward end tip so as to suck the fused solder, said forward end tip being attached detachably to a forward end of said instrument main body, wherein:

a backward half portion of said forward end tip surrounds a part of or most part of a heating gas flow generating chamber so as to be capable of being attached to a forward end of a solder iron main body;

a concave section forming a portion of said heating gas flow generating chamber is formed on a forward half portion of said forward end tip, an orifice section is formed on a forward end of said concave section, and a nozzle section is attached to a forward half base portion of said forward end tip so as to surround the forward half portion and be opened forwardly and to be connected with said orifice section; and a suction passage for the fused solder is formed to be opened at the forward end portion, and a backward end side of said suction passage is provided so as to be capable of being connected with a suction mechanism.

22. A forward end tip of a solder suction instrument, said solder suction instrument for heating a forward end tip by means of heating means contained in a instrument main body and fusing solder by means of heat of said forward end tip so as to suck the fused solder, said forward end tip being attached detachably to a forward end of said instrument main body, wherein:

a backward half portion of said forward end tip is inserted into a heating gas flow generating chamber or said heating means so as to be capable of being attached to a forward end of a solder iron main body;

a concave section forming a portion of said heating gas flow generating chamber is formed on a forward half portion of said forward end tip, an orifice section is formed on a forward end of said concave section, and a nozzle section is attached to a forward half base portion of said forward end tip so as to surround the forward half portion and be opened forwardly and to be connected with said orifice section; and a suction passage for the fused solder is formed to be opened at the forward end portion, and a backward end side of said suction passage is provided so as to be capable of being connected with a suction mechanism.

23. A forward end tip of a solder suction instrument, said solder suction instrument for heating a forward end tip by means of heating means contained in a instrument main body and fusing solder by means of heat of said forward end tip so as to suck the fused solder, said forward end tip being attached detachably to a forward end of said instrument main body, wherein:

a backward half portion of said forward end tip is inserted into said heating means so as to be capable of being attached to a forward end of a solder iron main body;

an orifice section having a concave groove shape which is connected with a heating gas flow generating chamber is formed on a forward half outer periphery of said forward end tip, and a nozzle section is attached to a forward half base portion of said forward end tip so as to surround the forward half portion and be opened forwardly and to be connected with said orifice section; and a suction passage for the fused solder is formed to be opened at the forward end portion, and a backward end side of said suction passage is provided so as to be capable of being connected with a suction mechanism.

\* \* \* \* \*